United States Patent
Kahn et al.

(10) Patent No.: US 9,195,246 B2
(45) Date of Patent: Nov. 24, 2015

(54) VIRTUAL OUTPUT VOLTAGE SENSING FOR FEED-FORWARD CONTROL OF A VOLTAGE REGULATOR

(71) Applicant: Volterra Semiconductor Corporation, Fremont, CA (US)

(72) Inventors: Seth Kahn, San Francisco, CA (US); Joel Tang, Sembawang (SG); Jingquan Chen, San Jose, CA (US)

(73) Assignee: Volterra Semiconductor Corporation, Fremont, CA (US)

( * ) Notice: Subject to any disclaimer, the term of this patent is extended or adjusted under 35 U.S.C. 154(b) by 198 days.

(21) Appl. No.: 13/762,032

(22) Filed: Feb. 7, 2013

(65) Prior Publication Data
US 2013/0207627 A1 Aug. 15, 2013

Related U.S. Application Data

(60) Provisional application No. 61/597,062, filed on Feb. 9, 2012.

(51) Int. Cl.
*H02M 1/38* (2007.01)
*H02M 3/158* (2006.01)
*G05F 1/46* (2006.01)

(52) U.S. Cl.
CPC ........................................ *G05F 1/46* (2013.01)

(58) Field of Classification Search
CPC ..................... G05F 3/24; H02M 3/156–3/157; H02M 1/38; H02M 3/1588; Y02B 70/1466
USPC ................... 323/265, 282–284, 351
See application file for complete search history.

(56) References Cited

U.S. PATENT DOCUMENTS

| | | | |
|---|---|---|---|
| 5,847,554 A | 12/1998 | Wilcox et al. | |
| 6,020,729 A | 2/2000 | Stratakos et al. | |
| 6,160,441 A | 12/2000 | Stratakos et al. | |
| 6,225,795 B1 * | 5/2001 | Stratakos et al. | 323/283 |
| 6,278,264 B1 | 8/2001 | Burstein et al. | |
| 6,445,244 B1 | 9/2002 | Stratakos et al. | |
| 6,462,522 B2 | 10/2002 | Burstein et al. | |
| 6,476,589 B2 | 11/2002 | Umminger et al. | |

(Continued)

OTHER PUBLICATIONS

Analog Devices, (2007) "Low Duty Cycle, 600 mA, 3 MHz Synchronous Step-Down DC-to-DC Converter," ADP2102 (Product Design Brochure), *Analog Devices, Inc.*, 24 pp.

(Continued)

*Primary Examiner* — Timothy J Dole
*Assistant Examiner* — Sisay G Tiku
(74) *Attorney, Agent, or Firm* — Weaver Austin Villeneuve & Sampson LLP

(57) ABSTRACT

Disclosed are devices, apparatus, circuitry, components, mechanisms, modules, systems, and methods for virtual output voltage sensing for feed-forward control of a voltage regulator. A buffer has an input coupled to sense a monitored signal indicating a duty cycle of switch circuitry coupled to an output filter of the voltage regulator. The buffer is configured to provide at an output, responsive to the monitored signal, a buffer output signal having a high reference voltage for a high side on time and a low reference voltage for a low side on time of the switch circuitry. A filter is coupled to receive and filter the buffer output signal to provide a feed-forward signal indicating the output voltage of the voltage regulator. Control circuitry is configured to control the switching of the switch circuitry responsive to the feed-forward signal.

34 Claims, 11 Drawing Sheets

(56) References Cited

U.S. PATENT DOCUMENTS

| | | |
|---|---|---|
| 6,664,774 B2 | 12/2003 | Lethellier |
| 6,713,823 B1 | 3/2004 | Nickel |
| 7,023,182 B1 * | 4/2006 | Kleine et al. ............. 323/212 |
| 7,161,332 B1 * | 1/2007 | Kleine et al. ............. 323/222 |
| 7,170,267 B1 | 1/2007 | McJimsey |
| 7,245,113 B2 | 7/2007 | Chen et al. |
| 7,944,240 B2 * | 5/2011 | Byeon ............. 326/86 |
| 8,018,208 B1 | 9/2011 | Kahn et al. |
| 8,120,342 B1 | 2/2012 | Kahn et al. |
| 8,283,902 B1 | 10/2012 | Kahn et al. |
| 8,629,669 B2 | 1/2014 | Tournatory et al. |
| 8,779,744 B2 | 7/2014 | Kahn |
| 2009/0073022 A1 * | 3/2009 | Yamauchi ............. 341/173 |
| 2012/0025796 A1 | 2/2012 | Kahn |
| 2012/0025799 A1 | 2/2012 | Kahn |
| 2013/0063114 A1 * | 3/2013 | Agrawal et al. ............. 323/283 |
| 2014/0210442 A1 * | 7/2014 | Umetani ............. 323/282 |
| 2014/0250310 A1 * | 9/2014 | Chepuri et al. ............. 713/300 |

OTHER PUBLICATIONS

Analog Devices, (2009-2010) "Synchronous Current-Mode with Constant On-Time, PWM Buck Controller," ADP1872/ADP1873 (Product Design Brochure), *Analog Devices, Inc.*, 40 pp.

Chetty, P.R.K. (Copyright 1986) "Switch-Mode Power Supply Design," *TAB Professional and Reference Books*, 5 pp.

Linear Technology, (2008) "2.5A, 10V, Monolithic Synchronous Step-Down Regulator," LTC3602 (Product Design Brochure), *Linear Technology Corporation*, 20 pp.

Maxim, (Oct. 2003) "3A, 1MHz, 1% Accurate, Internal Switch Step-Down Regulator with Power-OK," MAX8505 (Product Design Brochure), *Maxim Integrated Products*, 15 pp.

* cited by examiner

VIRTUAL OUTPUT VOLTAGE SENSING FOR FEED-FORWARD CONTROL OF A VOLTAGE REGULATOR

PRIORITY DATA

This disclosure claims priority to commonly assigned U.S. Provisional Patent Application No. 61/597,062, filed Feb. 9, 2012, titled VIRTUAL $V_{OUT}$ SENSING FOR ON-TIME FEED-FORWARD CONTROL, by Kahn et al. The disclosure of this prior application is hereby incorporated by reference in its entirety and for all purposes.

BACKGROUND

This disclosure relates generally to voltage regulators and, more particularly, to the architecture and control mechanisms of switching voltage regulators.

Voltage regulators, such as direct current (DC) to DC converters, are used to provide stable voltages for electronic devices and systems. The general purpose of a voltage regulator is to convert a source voltage, such as the voltage of an alternating current (AC) or DC power source, into the operating DC voltage of an electronic device. By way of example, DC to DC converters can be used in computing and data communications applications including battery management in low power devices, such as routers, switches, servers, laptops and smartphones.

Switching voltage regulators, often referred to as "switching regulators", are a type of DC to DC converter that convert one DC voltage to another DC voltage with efficiency. A switching regulator generates an output voltage by converting an input DC voltage into a high frequency voltage and filtering the high frequency voltage to produce the output DC voltage.

Conventional switching regulators typically include a switch for alternately coupling and decoupling an unregulated input DC voltage source, such as a battery or intermediate DC bus voltage, to a load, such as an integrated circuit. An output filter, typically including an inductor and a capacitor, is coupled between the switch and the load to filter the output of the switch and thus provide the output DC voltage. Power is transmitted through the switch and into the output filter in the form of discrete current pulses. The switching regulator operates on the principle of storing energy in the inductor during one portion of a cycle and then transferring the stored energy to the capacitor in the next portion of the cycle. The output filter converts the current pulses into a steady load current so that the voltage across the load is regulated.

SUMMARY

The devices, apparatus, circuitry, components, mechanisms, modules, units, systems, and methods of this disclosure each have several innovative aspects, no single one of which is solely responsible for the desirable attributes disclosed herein.

According to one aspect of this disclosure, circuitry is provided for virtual output voltage sensing for feed-forward control of a voltage regulator. The circuitry includes a buffer having an input and an output. The buffer input is coupled to sense a monitored signal indicating a duty cycle of switch circuitry coupled to an output filter of the voltage regulator. The switch circuitry is configured to switch between a high voltage during a high side on time and a low voltage during a low side on time. The buffer is configured to provide at the buffer output, responsive to the monitored signal, a buffer output signal having a high reference voltage for the high side on time and a low reference voltage for the low side on time. A filter is coupled to receive and filter the buffer output signal to provide a feed-forward signal indicative of the output voltage of the voltage regulator. Control circuitry is configured to control the switching of the switch circuitry responsive to the feed-forward signal.

In some implementations, buffer tri-state circuitry, including a high side switch and a low switch switching in association with the switch circuitry, is coupled to cause the buffer to enter a high impedance state responsive to a tri-state condition of the switch circuitry. In some implementations, buffer bypass circuitry including a switch is coupled to short the buffer responsive to a tri-state condition of the switch circuitry.

In various implementations, the buffer can take different forms. For instance, the buffer can be a logic buffer. In other instances, the buffer can include one or more replica transistors associated with one or more transistors of the switch circuitry.

According to another aspect of this disclosure, a voltage regulator includes an output filter to be coupled to a load. Switch circuitry is coupled to the output filter. The switch circuitry is configured to switch between a high voltage during a high side on time and a low voltage during a low side on time. A buffer has an input and an output. The buffer input is coupled to sense a monitored signal indicating a duty cycle of the switch circuitry. The buffer is configured to provide at the buffer output, responsive to the monitored signal, a buffer output signal having a high reference voltage for the high side on time and a low reference voltage for the low side on time. A filter is coupled to receive and filter the buffer output signal to provide a feed-forward signal indicative of the output voltage of the voltage regulator. Control circuitry is configured to control the switching of the switch circuitry responsive to the feed-forward signal.

According to another aspect of this disclosure, a method for virtual output voltage sensing for feed-forward control of a voltage regulator is provided. A monitored signal indicating a duty cycle of switch circuitry coupled to an output filter of the voltage regulator is sensed. Responsive to the monitored signal, a buffer output signal having a high reference voltage for the high side on time and a low reference voltage for the low side on time is provided. The buffer output signal is filtered to provide a feed-forward signal indicative of the output voltage of the voltage regulator. A control signal is provided to the switch circuitry responsive to the feed-forward signal.

The disclosed circuitry and techniques are applicable to various control schemes including hysteretic current mode, hysteretic voltage mode, constant on time mode, and constant off time mode.

Details of implementations are set forth in the accompanying drawings and the description below. Various features and aspects of the disclosed subject matter may be realized by reference to the remaining portions of the specification and the drawings. Note that the relative dimensions of the following figures may not be drawn to scale.

BRIEF DESCRIPTION OF THE DRAWINGS

The included drawings are for illustrative purposes and serve only to provide examples of possible structures and operations for the disclosed inventive devices, apparatus, circuitry, components, mechanisms, modules, systems, and methods.

Like reference numerals and designations in the various drawings indicate like elements.

DETAILED DESCRIPTION

Figure 1A:
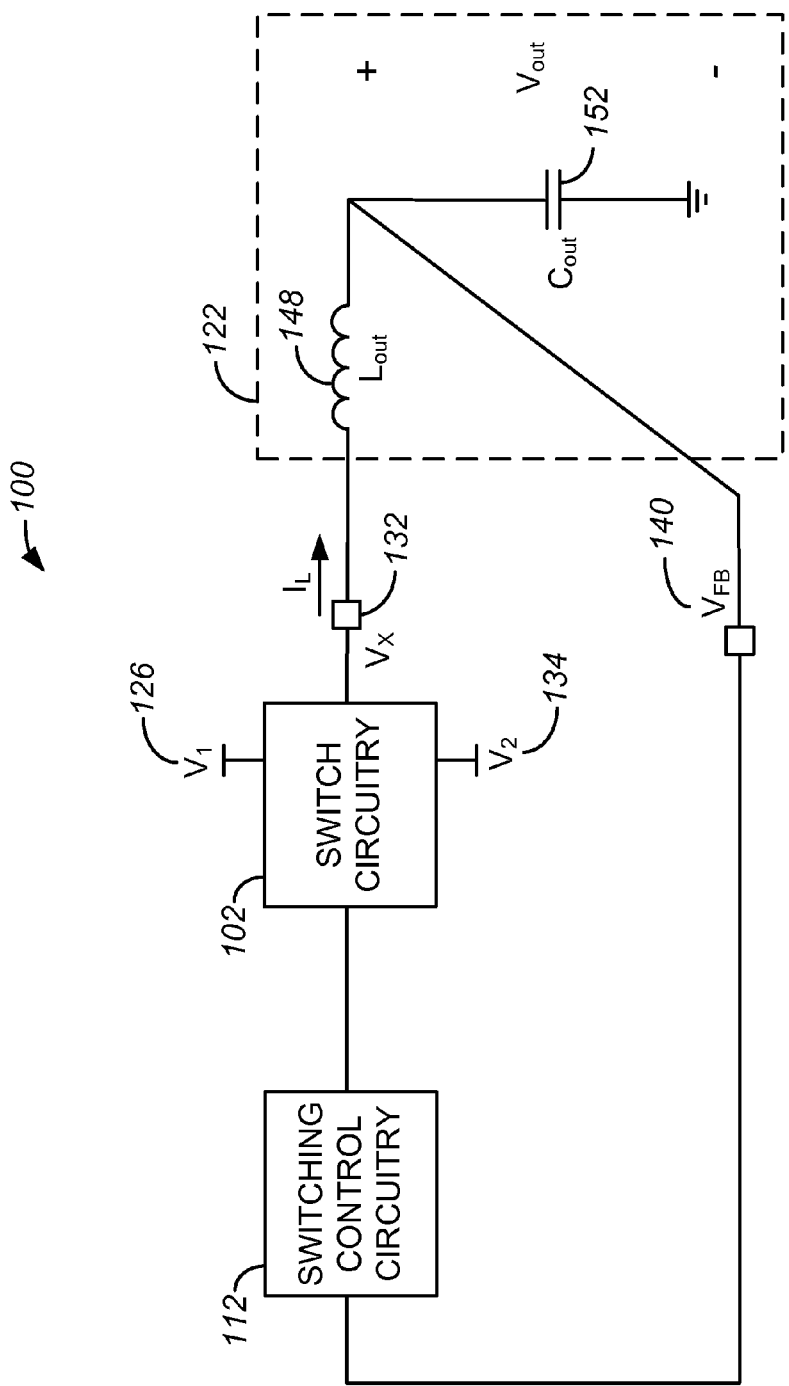
FIG. 1A is a simplified diagram of an example of components of a voltage regulator 100.

Reference will now be made in detail to specific implementations including the best modes contemplated by the inventors. Examples of these implementations are illustrated in the accompanying drawings. While the disclosed subject matter is described in conjunction with these specific implementations, it will be understood that it is not intended to be limited to the described implementations. On the contrary, it is intended to cover alternatives, modifications, and equivalents as may be included within the spirit and scope of the disclosure as defined by the appended claims. In the following description, details are set forth in order to provide a thorough understanding of the disclosed subject matter. The disclosed subject matter may be practiced without some or all of these specific details. In addition, well-known features may not have been described in detail to avoid unnecessarily obscuring the disclosed subject matter.

Some implementations of the disclosed devices, apparatus, circuitry, components, mechanisms, modules, units, systems, and methods provide techniques for enhanced virtual output voltage sensing for feed-forward control, for instance, in a pseudo-fixed frequency control architecture of a switching voltage regulator. For example, in a constant on time control architecture, a virtual output voltage of the voltage regulator can be determined by monitoring a duty cycle of switch circuitry rather than directly monitoring the output voltage of the regulator. In some of the disclosed techniques, circuitry can be implemented to buffer the monitored switching frequency to remove or significantly reduce second order effects of changes in the switching frequency of the switch circuitry in relation to load current fluctuations of the voltage regulator. Such changes are often attributable to one or more resistances in the path of the switch circuitry, such as intrinsic resistances of switching transistors, output inductor resistance, and/or printed circuit board ("PCB") resistance. Changes in the switching frequency can be undesirable, for instance, when the power efficiency of the voltage regulator is optimized at a certain frequency.

In some implementations, the duty cycle of the switch circuitry is monitored using a feedback loop. The monitored duty cycle can be used to control the switching pattern of the switch circuitry, for instance, by adjusting the on time of a low side or high side switch in a constant on time control architecture. The disclosed techniques are also applicable to other schemes incorporating pseudo-fixed frequency control, such as hysteretic current mode control architectures. For instance, a monitored voltage at the switch circuitry can be buffered and processed to adjust a ripple band of current delivered to the output filter in a hysteretic current mode control architecture. By way of example, the monitored duty cycle of the switch circuitry can be processed and applied as a control parameter to set one or both of upper and lower threshold levels defining an allowable ripple band. The disclosed techniques can also be implemented in voltage regulator circuits implementing other control schemes such as hysteretic voltage mode, constant on time mode, and constant off time mode, among others.

Some examples of the disclosed virtual output voltage sensing and feed-forward control techniques can be implemented with analog circuitry, digital circuitry, and combinations thereof. Analog implementations can provide for linear response adjustments and slew rate limited response adjustments based on the monitored duty cycle, as further described below. Digital implementations can include cycle-by-cycle adjustments and time averaged responses based on the monitored duty cycle, examples of which are described below. Various devices, apparatus, circuitry, components, mechanisms, modules, units, systems, and methods can be incorporated to monitor the duty cycle of the voltage regulator and generate correction terms, which can be communicated as signals conveying control parameters to govern the switching frequency of the regulator.

The disclosed implementations generally relate to and can be incorporated in switching voltage regulators and specific components thereof to facilitate voltage conversion. These implementations are generally described in relation to DC to DC converters that employ buck topologies (also referred to as buck regulators), which convert an input DC voltage to a lower output DC voltage of the same polarity. It should be understood that implementations are contemplated in which other topologies are employed in various combinations.

FIG. 1A is a simplified diagram of an example of components of a voltage regulator 100. The voltage regulator 100 includes three main components: switch circuitry 102, switching control circuitry 112, and an output filter 122 including an output inductor 148 and an output capacitor 152. The switch circuitry 102 is coupled to output filter 122 at a switching node 132, sometimes referred to herein as "node Vx" or simply "Vx". In particular, switch circuitry 102 has an output coupled to an input of inductor 148 at node Vx. An output of inductor 148 is coupled to a first terminal of output capacitor 152, while a second terminal of output capacitor 152 is coupled to ground. The output capacitor 152 can be coupled to a load (not shown) such as a microprocessor, ASIC, or other integrated circuit.

In FIG. 1A, switch circuitry 102 controls the flow of current into inductor 148 of output filter 122 at node Vx. This inductor current is referred to herein as "$I_L$". The switch circuitry 102 is generally configured to alternately couple output filter 122 at node Vx to a first voltage 126 ("$V_1$") and a second voltage 134 ("$V_2$"). For example, $V_1$ can be an input voltage source to be regulated, and $V_2$ can be another voltage, such as ground. In some implementations, one or more drivers can be coupled to an input of switch circuitry 102, for instance, as further described below with reference to FIG. 1B.

In FIG. 1A, switching control circuitry 112 is operatively coupled to control the alternate switching of switch circuitry 102 between $V_1$ and $V_2$ responsive to a feedback signal from output filter 122. In the illustrated example, switching control circuitry 112 has an input coupled to sense a feedback voltage 140 ("$V_{FB}$") at output filter 122, in particular, at a node between inductor 148 and capacitor 152. The switching control circuitry 112 also has an output coupled to the input of switch circuitry 102 to control the switching of switch circuitry 102 responsive to the sensed $V_{FB}$. Thus, switching control circuitry 112 forms a feedback loop from the output of inductor 148 to the input of switch circuitry 102 in this example. In alternative implementations, the input of switching control circuitry 112 can be coupled to sense voltages at other nodes of voltage regulator 100, such as node Vx.

Figure 1B:
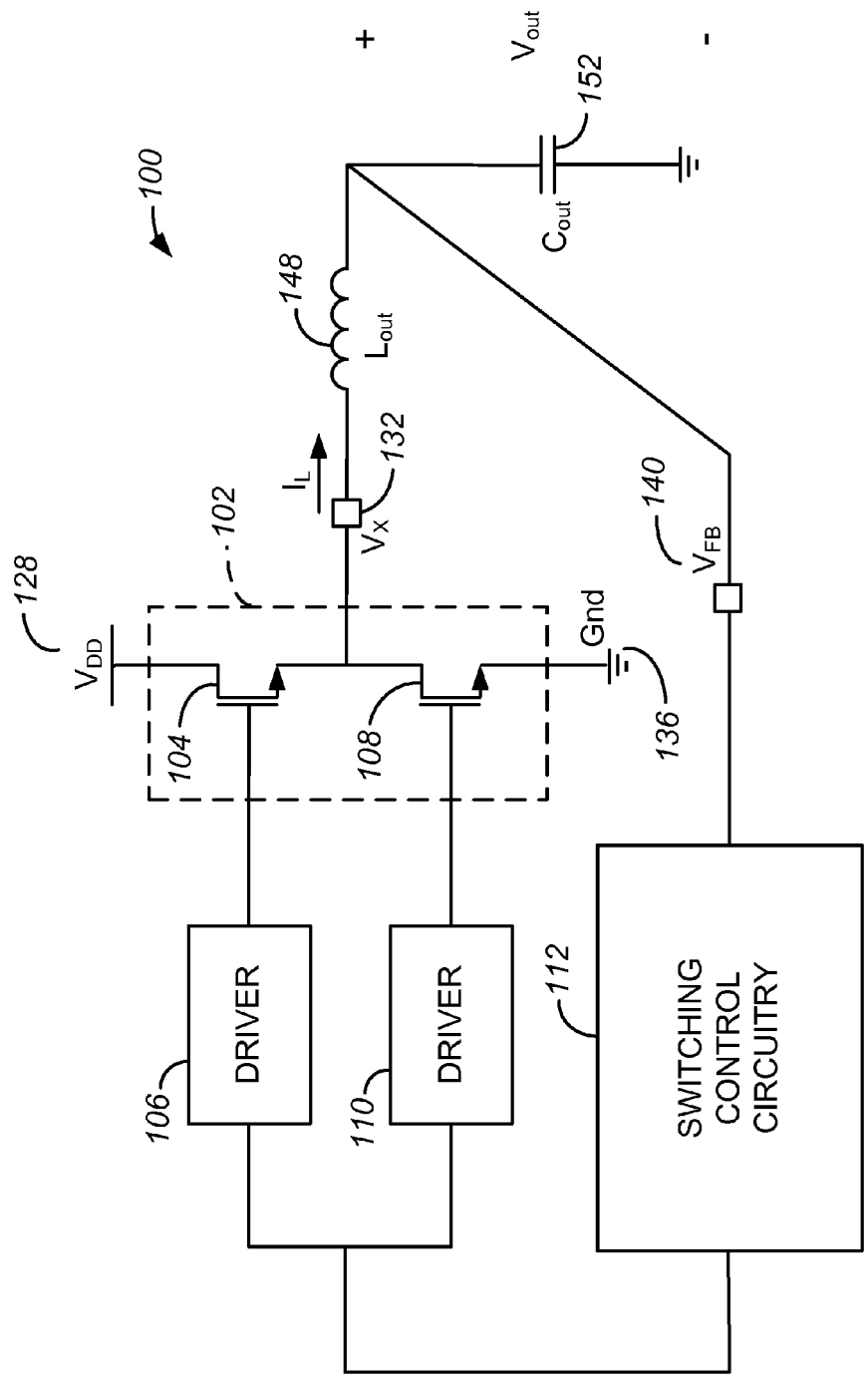
FIG. 1B is a simplified diagram of components of voltage regulator 100, showing one example of switch circuitry and drivers.

FIG. 1B is a simplified diagram of components of voltage regulator 100, showing one of many examples of switch circuitry and drivers. In this example, switch circuitry 102 incorporates a "high side" switch component 104, such as a transistor, and a "low side" switch component 108, such as a transistor or a diode. Here, high side switch component 104 is coupled to an input voltage 128 ("$V_{DD}$"), while low side switch component 108 is coupled to ground ("Gnd") 136. As used herein, a high side or low side switch component can be referred to as a high side or low side "switch". In some implementations, relative voltages of the switch components can be taken into account, for instance, when the value of $V_{DD}$ is higher than Gnd. In such examples, a first voltage such as $V_{DD}$ can be referred to as a "high voltage", while a second voltage such as Gnd can be referred to as a "low voltage".

In FIG. 1B, high side switch 104, in the form of a transistor, is configured to selectively couple the output filter at node Vx to $V_{DD}$, while low side switch 108, in the form of a separate transistor, is configured to selectively and alternately couple the output filter at node Vx to Gnd. In this example, one or more drivers can be included in the voltage regulator, such as an upper driver 106 and a lower driver 110 of FIG. 1B. The driver(s) generally include circuitry and logic configured to drive the switching of switch circuitry 102 between $V_{DD}$ and Gnd in this example. The driver(s) can also include protection circuitry, and other various analog and/or digital circuitry to monitor voltages and interact with components of switch circuitry 102. Depending on the desired implementation, drivers 106 and 110 can be located on the same or a different chip from switch circuitry 102, and/or can be located on the same or a different chip from switching control circuitry 112.

In FIG. 1B, upper driver 106 is coupled to a gate of the transistor serving as high side switch 104, and lower driver 110 is coupled to a gate of the transistor serving as low side switch 108. The drivers 106 and 110 are configured to drive the alternate on/off switching of high side switch 104 and low side switch 108 so node Vx is alternately coupled between $V_{DD}$ and Gnd, in this example. The drivers 106 and 110 have inputs coupled to the output of switching control circuitry 112 so that switching control circuitry 112 causes drivers 106 and 110 to alternate between: (i) switching high side switch 104 on while low side switch 108 is switched off, and (ii) switching low side switch 108 on while high side switch 104 is switched off. The relative time spent with the high side switch enabled compared to the low side switch enabled determines an output voltage ("Vout") developed across capacitor 152 of the output filter. In FIG. 1B, drivers 106 and 110 are configured to cooperate with one another in controlling the high side switch 104 and low side switch 108 states, for example, to ensure that both switches are not turned on at the same time.

A transistor incorporated into a high side or low side switch of switch circuitry 102 as described above can be implemented as a field effect transistor ("FET"), such as a metal oxide semiconductor field effect transistor ("MOSFET"), as illustrated in FIG. 1B. The high side FET of high side switch 104 can be p-channel or n-channel, depending on the desired implementation. In an alternative implementation, a different type of transistor is used, such as a junction gate field effect transistor ("JFET"). In the example of FIG. 1B, while high side switch 104 is illustrated as one FET, high side switch 104 can be implemented to include one or more transistors, such as n-channel FETs. By the same token, low side switch 108 can also be implemented to include one or more transistors, such as n-channel FETs. For example, high side switch 104 could include a number of transistors coupled in parallel and acting in unison. The node Vx at the output of switch circuitry 102 is situated between the high side FET and the low side FET, in this implementation, between the source of the high side FET and the drain of the low side FET.

In the example of FIG. 1B, the high side on time, or "$T_{HS,ON}$", generally refers to the on time of high side switch 104 during a given switching period, Tsw, of the alternate on/off switching of high side switch 104 and low side switch 108. By the same token, the low side on time, or "$T_{LS,ON}$", refers to the on time of low side switch 108 during Tsw. In some constant on time implementations, the high side on time remains fixed while the low side on time is regulated. Thus, $T_{HS,ON}$ can be implemented using a timer, as illustrated in some of the examples described below. The duty cycle of switch circuitry 102 is the ratio of $T_{HS,ON}$ to the switching period, Tsw. This duty cycle determines the output voltage (Vout) of voltage regulator 100. With a constant on time control scheme, $T_{SW}$ is determined during the course of voltage regulation and can be a function of $T_{HS,ON}*V_{DD}/V_{out}$.

Because $T_{HS,ON}$, an input voltage such as $V_{DD}$, and Vout are determinable in constant on time regulator design, it can be desirable that a user or computer processor be able to program the $T_{HS,ON}$, $V_{DD}$, and Vout values to determine the switching frequency, "Fsw", of the switch circuitry, where Fsw is 1/Tsw. The particular Vout value of a voltage regulator implementation will vary, depending on the particular load, and $V_{DD}$ may fluctuate between a known range of values, for instance, in the case of a battery. When $V_{DD}$ and Vout are generally known, a circuit designer skilled in the art should be able to adjust $T_{HS,ON}$ to obtain a desired switching frequency. In some applications, circuitry can be configured to automatically determine and control $T_{HS,ON}$ to set a desired switching frequency.

With voltage regulators that employ a constant high side on time architecture, $T_{HS,ON}$ can be implemented as a function of $V_{DD}$ and Vout, such that the switching frequency can be programmed to a desired value regardless of the $V_{DD}$ and Vout values. In such cases, Fsw can be independent of both $V_{DD}$ and Vout. Systems implementing such pseudo-fixed frequency constant on time regulation can have an undesirable second order effect in the form of increasing switching frequency versus current pulled by the load. This load current is generally the average of the inductor current, $I_L$, described above. The Fsw drift versus load current often occurs due to one or more resistances in the path of the switch circuitry, such as intrinsic resistances of transistors implementing high side and/or low side switches 104 and 108. The Fsw drift versus load current can also or alternatively arise due to PCB resistance, parasitic resistance of inductor 148 of the output filter, and/or any other source of resistance in the path of switch circuitry 102 in the voltage regulator.

Due to such resistance(s), the output voltage, Vout, of the voltage regulator, having the same value as the filtered voltage waveform at node Vx, can become increasingly negative at higher load currents. Since the voltage regulator is generally a closed loop system, control circuitry will compensate to maintain the average voltage value at Vx at a desired regulation point. Some of the disclosed techniques compensate for this issue by providing buffer circuitry configured to monitor the duty cycle of the switching circuitry in relation to a voltage such as $V_{DD}$. Thus, any drop in the average voltage at node Vx versus load current can be ignored. The result is a proxy or virtual output voltage that mimics Vx but does not have any voltage drop that might occur at Vx.

Figure 2:
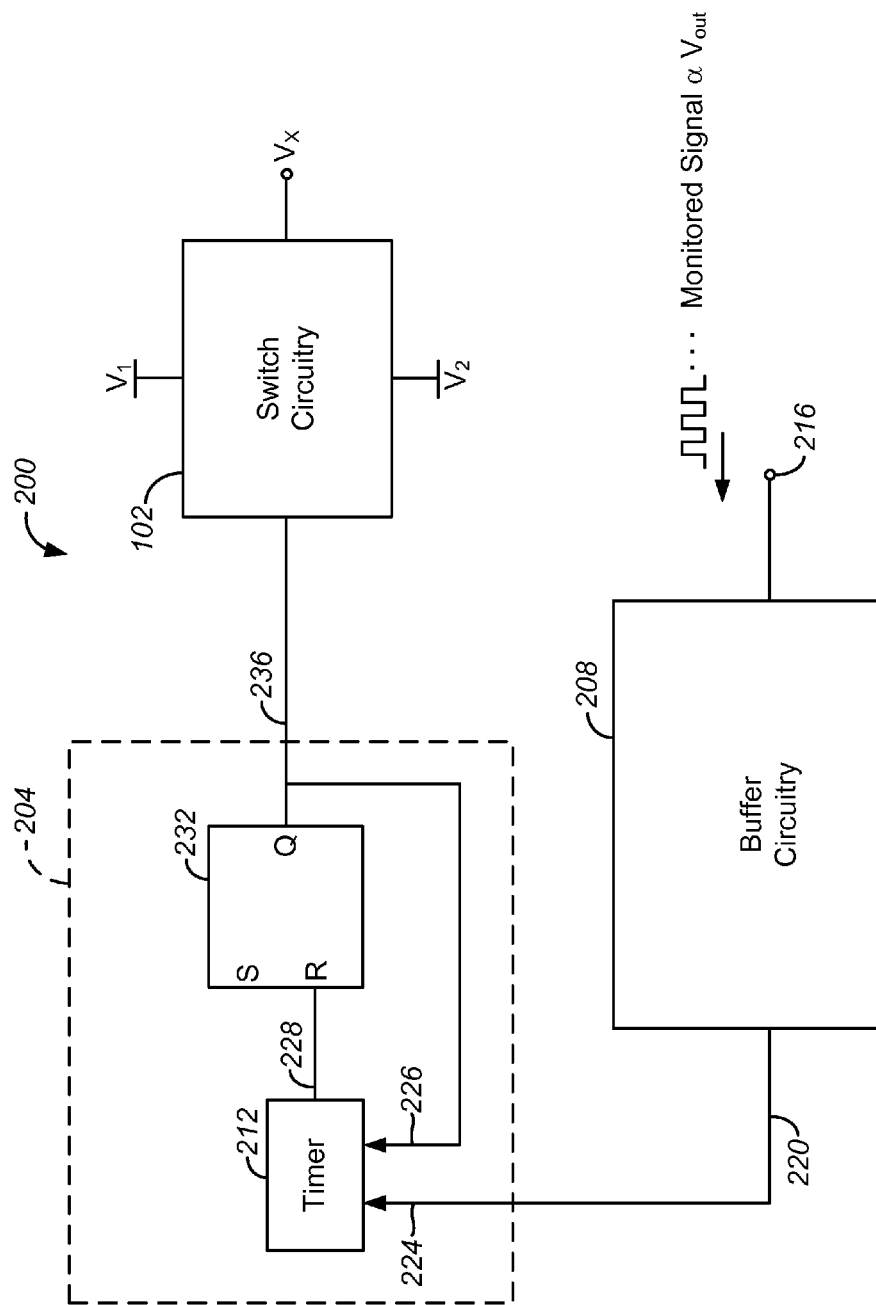
FIG. 2 is a simplified diagram of an example of circuitry for virtual output voltage sensing for feed-forward control of a voltage regulator, including timing control circuitry, according to some implementations.

FIG. 2 is a simplified diagram of an example of circuitry for virtual output voltage sensing for feed-forward control of a voltage regulator, including timing control circuitry 204, according to some implementations. The timing control circuitry 204 of FIG. 2 is that of a constant on time regulator, representing one of various examples of the disclosed circuits and techniques. The timing control circuitry 204 of FIG. 2 is generally configured to control the switching frequency, Fsw, of switch circuitry 102. The timer control circuitry 204 is operatively coupled to switch circuitry 102 to cause switch circuitry 102 to have a constant high side on time. In other examples, timer control circuitry 204 can be configured to implement a constant low side on time. The timing control circuitry 204 can be included as a component of switching control circuitry 112 of FIGS. 1A and 1B, in some implementations.

In FIG. 2, in some implementations, buffer circuitry 208 is operatively coupled to a timer 212 of timing control circuitry 204. The buffer circuitry 208 can also be a component of switching control circuitry 112, in some implementations, or can be a separate component in some other implementations. The buffer circuitry 208 can be implemented to include analog circuitry, digital circuitry, and combinations thereof, depending on the desired implementation.

In FIG. 2, buffer circuitry 208 has an input 216 coupled to sense a monitored signal indicating a duty cycle of switch circuitry 102 of FIGS. 1A and 1B. In FIG. 2, input 216 can be coupled to node Vx, so buffer circuitry 208 can sense the switching frequency of switch circuitry 102 at Vx. In other examples, buffer circuitry 208 can be coupled to sense the switching frequency at other nodes or sources for such information in the voltage regulator, such as the gate of a FET serving as high side switch 104, a replica FET sharing a gate drive signal with high side switch 104, or an internal or external control signal of one of the driver and control units 106 and 110 of FIG. 1B. The duty cycle can also or alternatively be derived from $I_L$, described above with reference to FIG. 1A. The buffering scheme provided by buffer circuitry 208 in FIG. 2 creates a voltage waveform replicating the monitored signal without voltage drops inherent in a changing load current due to one or more resistances, as generally described above.

In FIG. 2, in some implementations, in response to the monitored signal received at input 216, buffer circuitry 208 is configured to generate a buffer output signal having a first reference voltage during the time that high side switch 104 of switch circuitry 102 is turned on and a second reference voltage during the time that low side switch 108 of switch circuitry 102 is on. In one example, the first reference voltage can be $V_1$, and the second reference voltage can be $V_2$, the same voltages provided to switch circuitry 102 in FIG. 1A. This buffer output signal can be filtered, as described in greater detail below, to provide, at a buffer circuitry output 220, a virtual feed-forward signal indicative of Vout across capacitor 152 of FIGS. 1A and 1B. This feed-forward signal can provide a control parameter, for instance, in the form of a correction term, to timer 212 of timing control circuitry 204 and can take various forms including current signals and voltage signals. The virtual output voltage feed-forward signal can indicate control parameter values such as designated times or pulse widths. The feed-forward signal can be interpreted by timing control circuitry 204 and generally used to govern the switching frequency of switch circuitry 102.

In FIG. 2, timer 212 has a first input 224 coupled to receive the virtual output voltage feed-forward signal from output 220 of buffer circuitry 208. In some implementations, the virtual output voltage feed-forward signal can indicate to timer 212 a control parameter in the form of an on time pulse width for low side switch 108 or another switching component of switch circuitry 102. In some other implementations, the virtual output voltage feed-forward signal can indicate different control parameters such as a reference time, or an adjustment to a reference time, a fixed time after which timer 212 will activate. An output 228 of timer 212 is coupled to a state machine register 232. In this example, register 232 is an SR latch, with timer output 228 connected to the "R" reset input. The "Q" output 236 of register 232 is coupled to switch circuitry 102 to control the on time of one of the switch components of the switch circuitry, such as the high side switch. Thus, in this example, Q output 236 provides a timing control signal to switch circuitry 102. The state machine register 232 and timer 212 of timing control circuitry 204 generally cooperate to control the switching of switch circuitry 102.

In FIG. 2, when timer output 228 goes high, that is, to a logic '1', this causes register 232 to be set. When register 232 is set, in the example of an SR latch, the Q output 236 goes high, which can turn on high side switch 104 of switch circuitry 102 in a constant on time control scheme. The timer 212 has a second input 226 coupled to Q output 236 of register 232 to monitor Q output 236. In this way, responsive to Q output 236 going high, timer 212 is coupled to activate the R input of register 232 a fixed time later to reset Q output 236 to a low value, e.g., a logic '0', and turn on low side switch 108, i.e., initiate the low side conduction time of switch circuitry 102. Thus, in this example, the voltage regulator is provided with a fixed high side on time representing a time when high side switch 104 is turned on. The low side on time representing a time during which low side switch 108 is turned on, however, varies to provide the desired regulation. The virtual output voltage feed-forward signal delivered from buffer circuitry 208 to timing control circuitry 204 can thus provide an appropriate correction term be used by timer 212 to adjust low side on times without having to monitor the switching frequency of switch circuitry 102.

Figure 3:
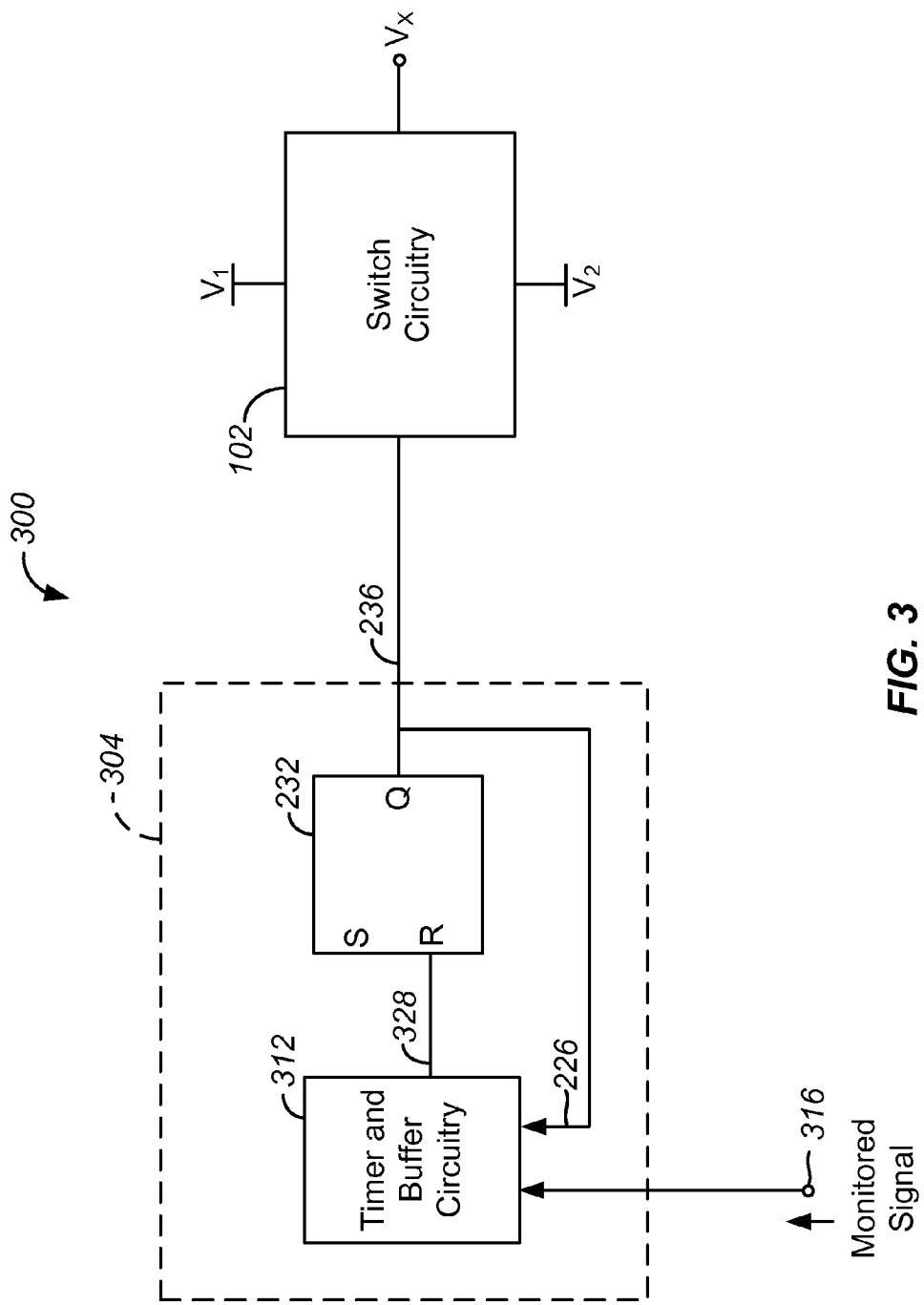
FIG. 3 is a simplified diagram of another example of circuitry for virtual output voltage sensing for feed-forward control of a voltage regulator, according to some implementations.

FIG. 3 is a simplified diagram of another example of circuitry for virtual output voltage sensing for feed-forward control of a voltage regulator, according to some implementations. The circuitry of FIG. 3 is similar to that of FIG. 2 in some respects, with like reference numerals indicating like parts. As an alternative to the configuration of FIG. 2, in which buffer circuitry 208 is a physically separate component from timing control circuitry 204, in FIG. 3, the timer is modified to include the buffer circuitry, as represented by timer and buffer circuitry 312. For example, timer and buffer circuitry 312 can be an integrated circuit, or timer 212 and buffer circuitry 208 of FIG. 2 can be discrete components in the same package. The operability of timer and buffer circuitry 312 of FIG. 3 is generally the same as timer 212 and buffer circuitry 208 of FIG. 2. In FIG. 3, however, timing control circuitry 304 has an input 316 coupled to directly receive the monitored signal, which is provided to buffer circuitry input 216 of FIG. 2. In FIG. 3, an output 328 of timer and buffer circuitry 312 replaces timer output 228 of FIG. 2, but otherwise conveys the same information to register 232 as described above.

Figure 4:
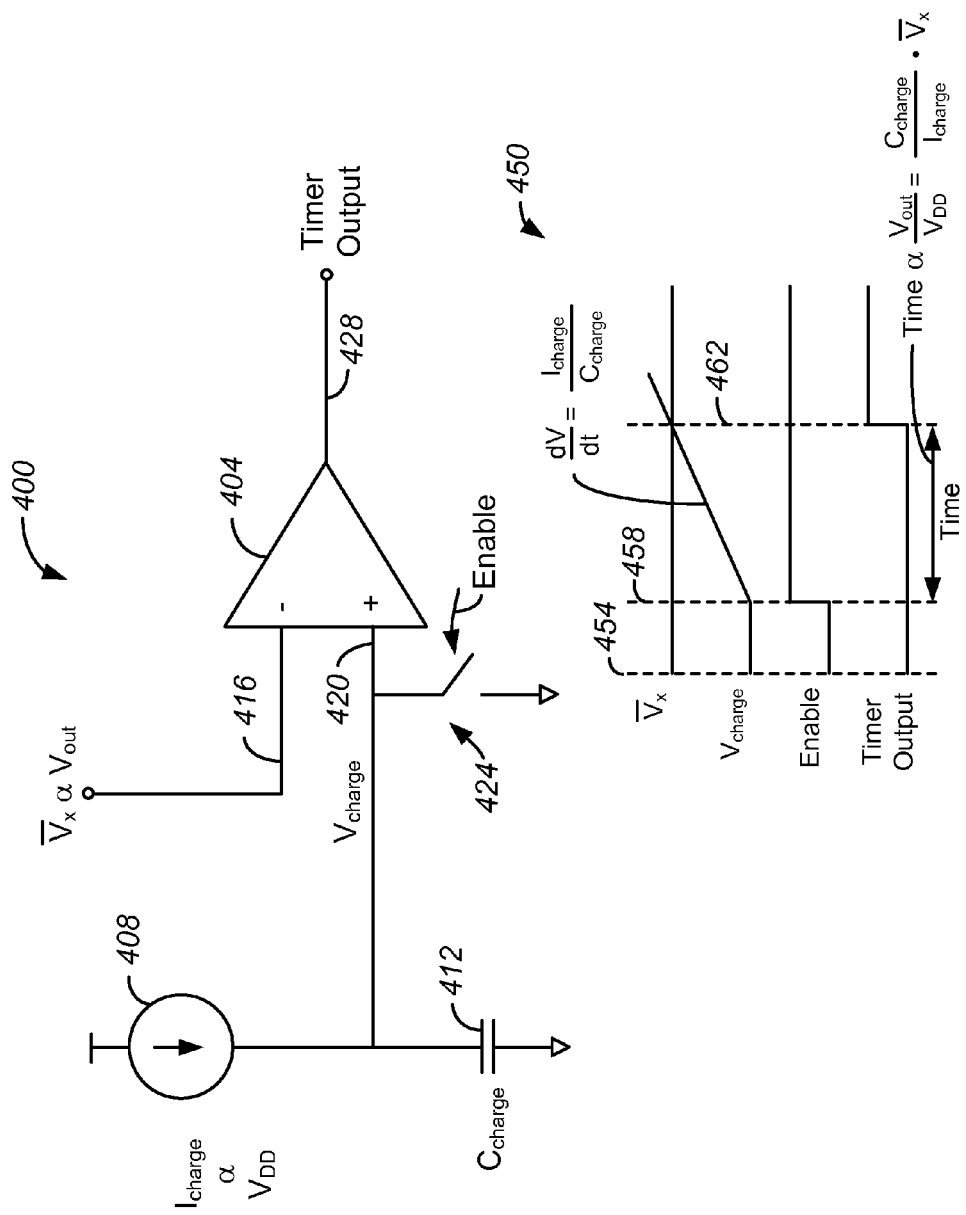
FIG. 4 is a simplified diagram of an example of timer circuitry for virtual output voltage sensing for feed-forward control of a voltage regulator, according to some implementations.

FIG. 4 is a simplified diagram of an example of timer circuitry for virtual output voltage sensing for feed-forward control of a voltage regulator, according to some implementations. FIG. 4 represents one implementation of a pseudo-fixed frequency constant on time regulation architecture. For example, timer 212 of FIG. 2 or the timer part of timer and buffer circuitry 312 of FIG. 3 can be implemented in timer circuitry 400 of FIG. 4. The timer circuitry 400 includes a comparator 404, a current source 408 having a current "Icharge", which is proportional to $V_{DD}$, and a capacitor 412 having a capacitance "Ccharge".

In the case of a constant high side on time control architecture, timing control circuitry 204 or 304 of FIGS. 2 and 3 is generally configured to control the low side on time of switch circuitry 102 to provide pseudo-fixed frequency operation. The on time is desirably proportional to the output voltage of the voltage regulator and inversely proportional to an input voltage of the regulator, such as $V_{DD}$ in the examples above. The circuitry of FIG. 4 provides the desired relationship of the on time to the input and output voltages by implementing current source 408 to be proportional to $V_{DD}$ and providing Icharge to charge capacitor 412. A charge voltage, Vcharge, can be generated as a result of Icharge being delivered to capacitor 412. Vcharge is provided to a compare input 420 of comparator 404. In this example, a virtual output voltage feed-forward signal based on a monitored voltage at node Vx of voltage regulator 100 of FIGS. 1A and 1B is proportional to Vout, as described above. The virtual output voltage feed-forward signal is provided to a reference input 416 of comparator 404. This feed-forward signal can be in the form of a digital logic equivalent of the actual voltage at node Vx, due to the presence of buffer circuitry as disclosed herein to buffer the monitored Vx voltage waveform. The virtual output voltage feed-forward signal serves as a reference voltage to comparator 404. Thus, at comparator 404, Vcharge at compare input 420 is compared with the feed-forward signal delivered to reference input 416.

In FIG. 4, an enable switch 424 is coupled between compare input 420 of comparator 404 and ground. The enable switch 424 is operatively coupled to be selectively closed or opened in response to an enable signal changing states when timing events occur. At a first time 454, as shown in the timing diagram 450 of FIG. 4, the enable signal is low or a logic '0', causing switch 424 to be closed and compare input 420 grounded. When the enable signal changes to a high state or a logic '1' at a second time 458, switch 424 opens, causing Vcharge at compare input 420 to ramp up at a rate of Icharge/Ccharge, as illustrated in timing diagram 450 of FIG. 4. At a third time 462, when Vcharge crosses the reference voltage at input 416 of comparator 404, an output 428 of comparator 404, serving as timer output 228 of FIG. 2 or output 328 of circuitry 312 in FIG. 3, changes state, for instance, from a logic '0' to a logic '1'. Thus, in timing diagram 450 of FIG. 4, a time period 466 between second time 458 and third time 462, that is, between the enable signal going high and comparator output 428 going high, is proportional to Vout and inversely proportional to $V_{DD}$.

Figure 5:
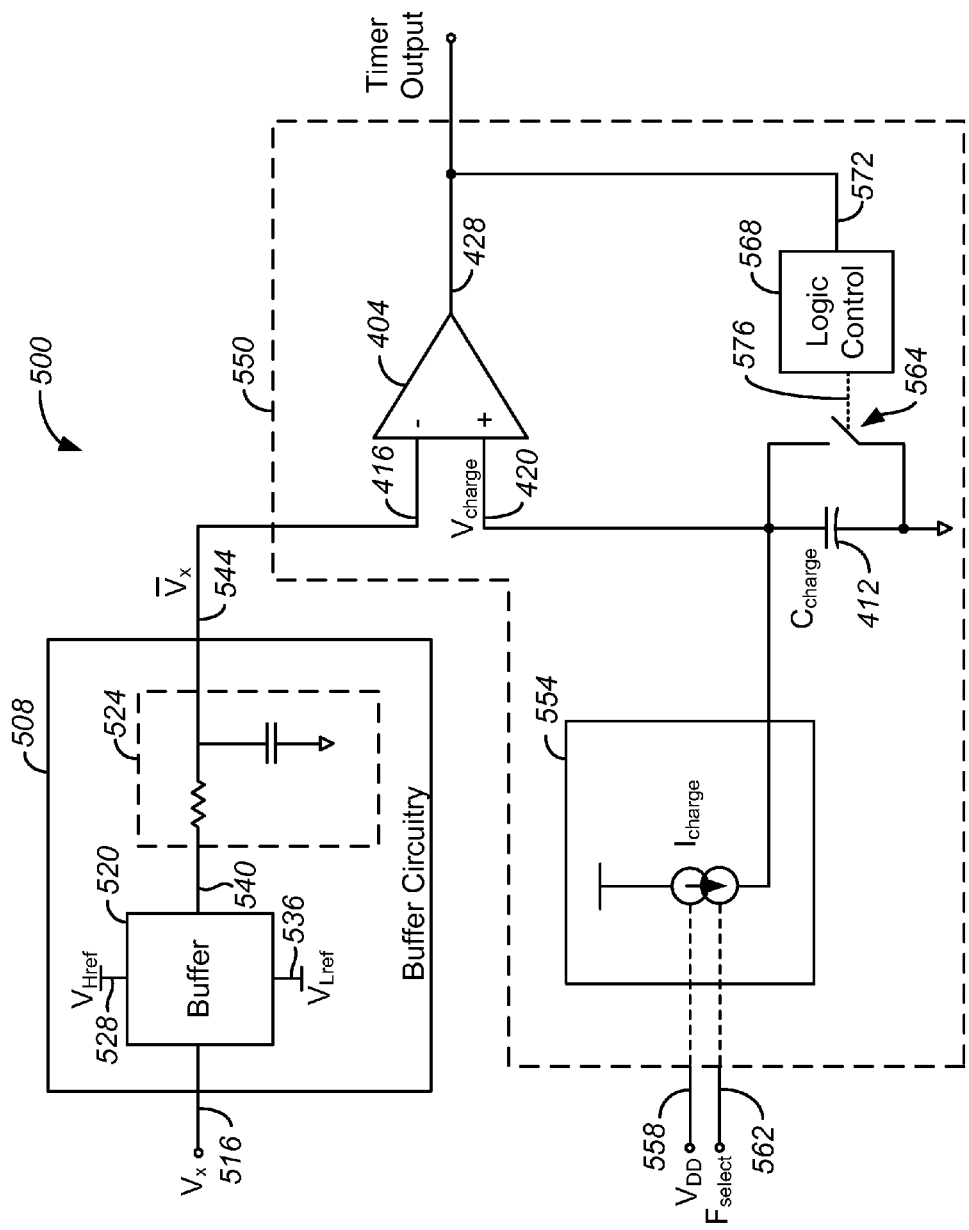
FIG. 5 is a simplified diagram of an example of timer circuitry for virtual output voltage sensing for feed-forward control of a voltage regulator, according to some implementations.

FIG. 5 is a simplified diagram of an example of timer circuitry for virtual output voltage sensing for feed-forward control of a voltage regulator, according to some implementations. The circuitry of FIG. 5 is similar to that of FIGS. 2-4 in some respects, with like reference numerals indicating like parts. The buffer circuitry 508 has an input 516 coupled to node Vx of regulator 100 of FIGS. 1A and 1B. As mentioned above, input 516 can be coupled to other nodes in voltage regulator 100 to monitor the duty cycle of switch circuitry 102. The buffer circuitry 508 of FIG. 5 includes a buffer 520 and a filter 524 implemented as a resistor-capacitor ("RC") filter. The buffer 520 includes a first reference input 528 coupled to receive a high reference voltage, $V_{Href}$, and a second reference input 536 coupled to receive a low reference voltage, $V_{Lref}$. In this example, in response to a monitored signal such as the Vx waveform sensed at input 516, buffer 520 is configured to provide at an output 540 a buffer output signal having the $V_{Lref}$ value when the monitored signal at Vx is high, that is, while high side switch 104 is on, and having the $V_{Lref}$ value when low side switch 108 is on and Vx is low.

In FIG. 5, RC filter 524 is coupled to receive the buffer output signal at output 540 of buffer 520 and filter the buffer output signal to provide a feed-forward signal at an output 544 of buffer circuitry 508. The feed-forward signal generated by RC filter 524 is the average of the voltage waveform at Vx and is a proxy or virtual representation of the output voltage of voltage regulator 100.

In FIG. 5, timer 212 of FIG. 2 or the timer part of timer and buffer circuitry 312 of FIG. 3 can be implemented in timer circuitry 550. The timer circuitry 550 includes comparator 404 as described above, a current source 554 similar in some respects to current source 408 of FIG. 4 and providing Icharge, which is proportional to $V_{DD}$, and capacitor 412 as described above. In this example, a voltage input 558 to current source 554 provides $V_{DD}$, and a frequency select input 562 allows a user or computer to program or otherwise input a desired switching frequency for regulator implementations in which a level of programmability is desired. The designated switching frequency conveyed by frequency select input 562 can be hard-wired on the chip or can be delivered from another component such as an on-chip or off-chip microcontroller. The designated frequency can be adjustable and/or can be user-defined, depending on the desired implementation. In some implementations, frequency select input 562 can be omitted or set to zero.

In some implementations, a variable resistance is provided at voltage input 558 to also allow a user or computer to adjust Icharge in relation to $V_{DD}$. The current source 554 provides Icharge to charge capacitor 412 to generate Vcharge at compare input 420 of comparator 404, as described above. The comparator 404 compares Vcharge at input 420 with the virtual output voltage feed-forward signal at input 416 as described above. Thus, in a constant high side on time implementation, the timer output signal provided at comparator output 428 can indicate the high side on time to switch circuitry 102 of FIGS. 1A and 1B, in response to: i) a virtual output voltage feed-forward signal at comparator input 416 based on the Vx signal provided to input 516, ii) a virtual input voltage feed-forward signal at comparator input 420 based on $V_{DD}$ provided to input 558, and iii) the desired frequency provided to input 562.

In FIG. 5, an enable switch 564 replaces switch 424 of FIG. 4. A logic control unit 568 has an input 572 coupled the timer output, that is, comparator output 428 in this example, and an output 576 operatively coupled to control enable switch 564 to close or open in response to timing events indicated by the timer output, as generally described above with reference to timing diagram 450 of FIG. 4.

Figure 6:
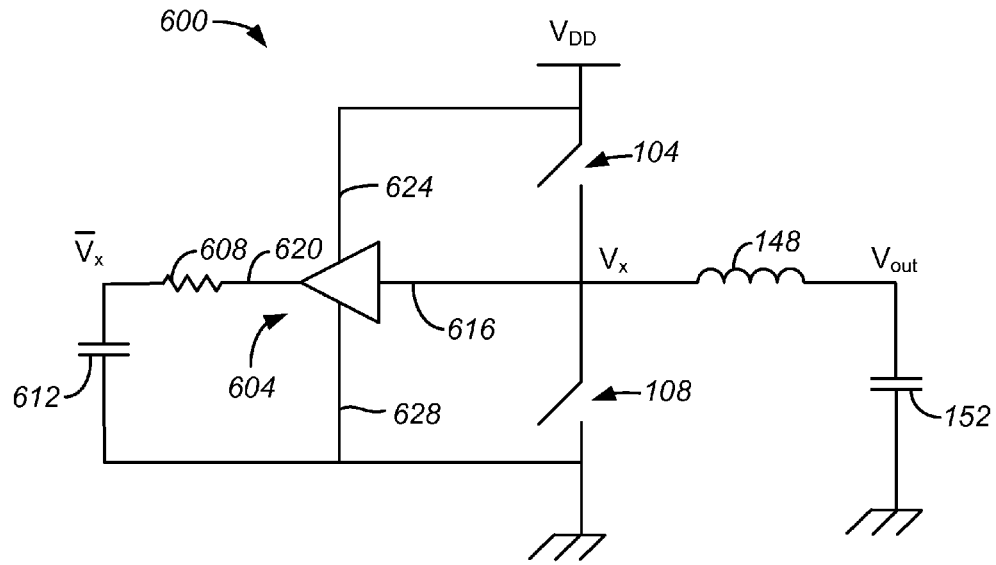
FIG. 6 is a simplified diagram of an example of buffer circuitry for generating a virtual output voltage feed-forward signal, according to some implementations.

FIG. 6 is a simplified diagram of an example of buffer circuitry for generating a virtual output voltage feed-forward signal, according to some implementations. The buffer circuitry 600 includes a buffer 604 coupled to an RC filter including a resistor 608 and a capacitor 612, as generally described above with reference to buffer circuitry 508 of FIG. 5. The buffer 604 has an input 616 coupled to node Vx and an output 620 coupled to resistor 608, similar to circuitry 508 of FIG. 5. The buffer 604 includes a high reference input 624 coupled to $V_{DD}$, serving as a high reference voltage in this example, and includes a low reference input 628 coupled to ground, serving as a low reference voltage. Thus, in some implementations, buffer reference inputs 624 and 628 can share the $V_{DD}$ and ground connections of high side switch 104 and low side switch 108 of FIG. 1B. The particular high reference voltage at reference input 624 is dependent on the value of $V_{DD}$, and the low reference voltage at reference input 628 is dependent on the voltage connected to low side switch 108, ground in this example. Here, by connecting input 616 to Vx, and high reference input 624 to $V_{DD}$, buffer 604 is configured to monitor $V_{DD}$*(duty cycle). The buffer output 620 is driven to the same logic level as Vx, such that the voltage waveform at output 620 mimics the waveform at Vx but does not experience the voltage drop associated with one or more resistances that might affect the Vx waveform.

In FIG. 6, in some implementations, buffer 604 can be in the form of a digital buffer, such as two inverters in series, configured to buffer the Vx waveform with a logic level in which $V_{DD}$ is output as a logic '1' and ground is output as a logic '0'. In some other implementations, buffer 604 is in the form of an analog buffer. The buffer input 616 can be connected to other nodes than Vx in other examples, as described above. The buffer output signal at buffer output 620 indicates the switching pattern at node Vx. This switching pattern indicates the duty cycle of the voltage regulator without the possible negative effects of load current described above.

In some other implementations, reference inputs 624 and 628 of buffer 604 are set to other reference values than $V_{DD}$ and ground, respectively. In various examples, reference inputs 624 and 628 can be coupled to sense scaled versions of $V_{DD}$ and ground, dynamic or static voltages, or other arbitrary voltage values engineered to introduce dependencies or cancel dependencies of components of the voltage regulator circuitry. Thus, in instances when the high reference voltage at reference input 624 is de-coupled from $V_{DD}$, a first voltage of switch circuitry 102, the high reference voltage is independent of $V_{DD}$. By the same token, in instances when the low reference voltage at reference input 628 is de-coupled from ground, a second voltage of switch circuitry 102, the low reference voltage is independent of ground. One or both of the reference inputs 624 and 628 of buffer 604 can be de-coupled in this manner, depending on the desired implementation.

Figure 7:
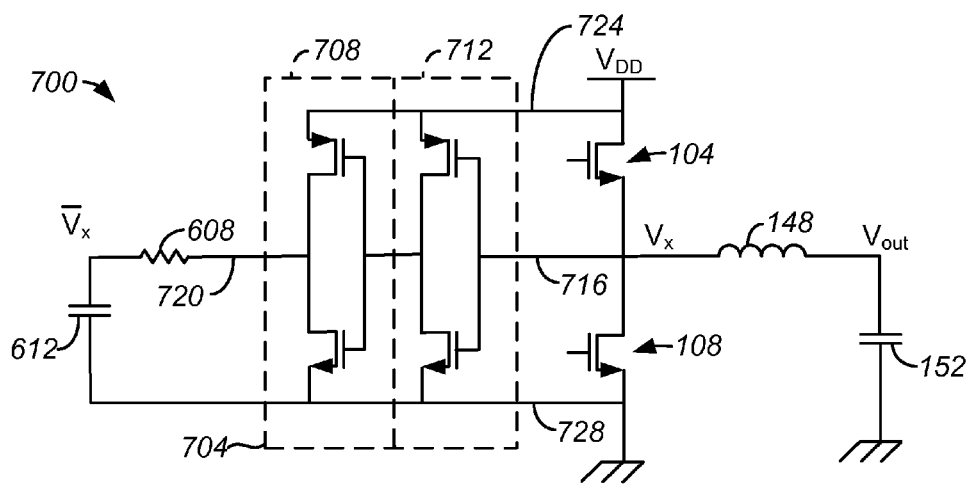
FIG. 7 is a simplified diagram of an example of buffer circuitry incorporating a logic buffer for generating a virtual output voltage feed-forward signal, according to some implementations.

FIG. 7 is a simplified diagram of an example of buffer circuitry incorporating a logic buffer for generating a virtual output voltage feed-forward signal, according to some implementations. The buffer circuitry 700 includes a logic buffer 704 coupled to an RC filter including a resistor 608 and a capacitor 612, as generally described above. The buffer 704 has an input 716 coupled to node Vx and an output 720 coupled to resistor 608. The buffer 704 includes a high reference input 724 coupled to $V_{DD}$ and a low reference input 728 coupled to ground. The buffer 704 is implemented as two inverters 708 and 712 coupled in series as illustrated. The inverter 712 includes a p-channel FET and an n-channel FET, both having gates connected to input 716. A source of the p-channel FET is connected to $V_{DD}$, and a source of the n-channel FET is connected to ground. The drains of the two FETs are coupled to each other. The inverter 708 is similarly implemented as a p-channel FET and an n-channel FET with both gates coupled to the drains of the FETs of inverter 712, with the sources coupled in the same manner as the FETs of inverter 712, and with drains both connected to buffer output 720.

Figure 8A:
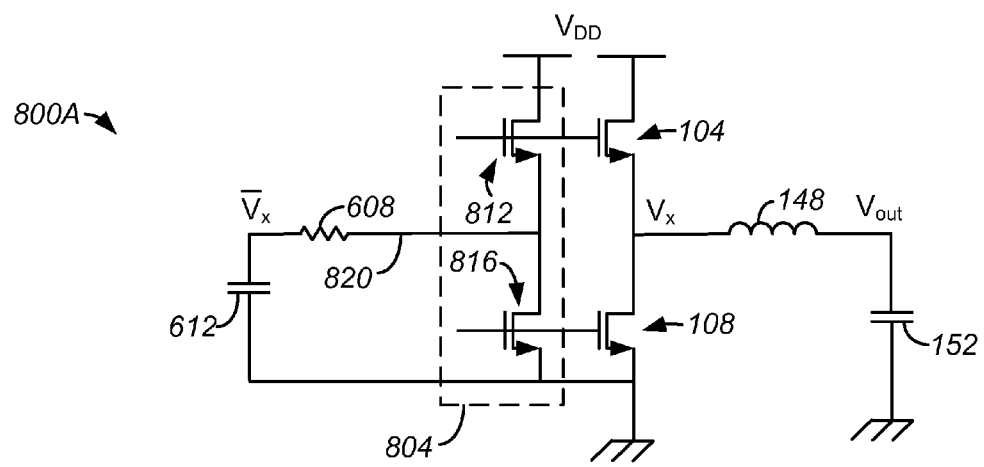
FIG. 8A is a simplified diagram of an example of buffer circuitry incorporating replica transistors for generating a virtual output voltage feed-forward signal, according to some implementations.

FIG. 8A is a simplified diagram of an example of buffer circuitry incorporating replica transistors for generating a virtual output voltage feed-forward signal, according to some implementations. The buffer circuitry 800A includes a buffer 804 coupled to a resistor 608 and a capacitor 612, as generally described above. The buffer 804 has a replica high side transistor 812 matched with high side switch 104, with the gates of transistor 812 and high side switch 104 coupled, and a replica low side transistor 816 matched with low side switch 108, with the gates of transistor 816 and low side switch 108 coupled. In this example, switches 104 and 108 are implemented as n-channel FETs, as are replica transistors 812 and 816. The source of transistor 812 and drain of transistor 816 are coupled to define a buffer output 820 coupled to resistor 608. The drain of transistor 812 serves as a high reference input coupled to $V_{DD}$, and the source of transistor 816 serves as a low reference input coupled to ground.

Figure 8B:
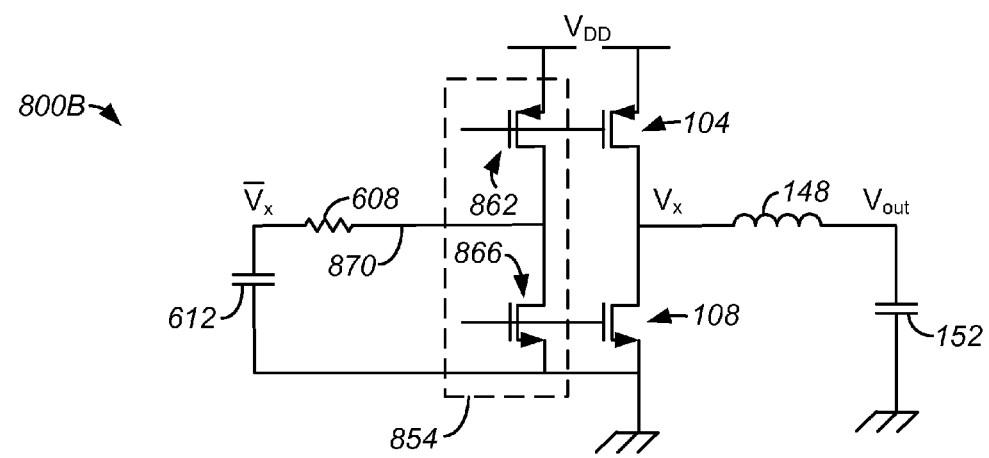
FIG. 8B is a simplified diagram of another example of buffer circuitry incorporating replica transistors for generating a virtual output voltage feed-forward signal, according to some implementations.

FIG. 8B is a simplified diagram of another example of buffer circuitry incorporating replica transistors for generating a virtual output voltage feed-forward signal, according to some implementations. The buffer circuitry 800B includes a buffer 854 coupled to a resistor 608 and a capacitor 612, as generally described above. The buffer 854 has a replica high side transistor 862 matched with high side switch 104, with the gates of transistor 862 and high side switch 104 coupled, and a replica low side transistor 866 matched with low side switch 108, with the gates of transistor 866 and low side switch 108 coupled. In this example, high side switch 104 is implemented as a p-channel FET, as is replica transistor 862. The low side switch 108 and replica transistor 866 are implemented as n-channel FETs. Here, the drains of transistor 862 and transistor 866 are coupled to define a buffer output 870 coupled to resistor 608. The source of transistor 862 serves as a high reference input coupled to $V_{DD}$, and the source of transistor 866 serves as a low reference input coupled to ground.

Implementations of the buffer circuitry and buffering techniques disclosed herein are applicable in continuous conduction mode ("CCM") architectures in which switch circuitry 102 of FIG. 1B toggles between high side switch 104 being turned on while low side switch 108 is turned off and vice versa. That is, in CCM, either high side switch 104 or low side switch 108 is turned on at any given time. The disclosed implementations are also applicable to discontinuous conduction mode ("DCM") architectures, also referred to as pulse frequency modulation architectures, in which both switches 104 and 108 can be turned off until the output voltage of the voltage regulator crosses a threshold, at which point switching events occur in switch circuitry 102 to deliver a current pulse to output filter 122 of the voltage regulator, as shown in FIG. 1A.

Thus, in DCM, when both switches 104 and 108 are off, a tri-state condition exists at switch circuitry 102. This tri-state condition can cause a monitored signal such as the voltage at Vx to not be valid, for instance, neither a logic '1' nor a logic '0'. Therefore, in DCM architectures, some of the disclosed implementations include circuitry configured to properly tri-state the buffer when such a tri-state condition arises. Various implementations of tri-state circuitry are possible that vary according to the buffer implementation. The disclosed tri-state implementations can be configured to cause the buffer to enter a high impedance state when a tri-state condition occurs at node Vx.

Figure 9A:
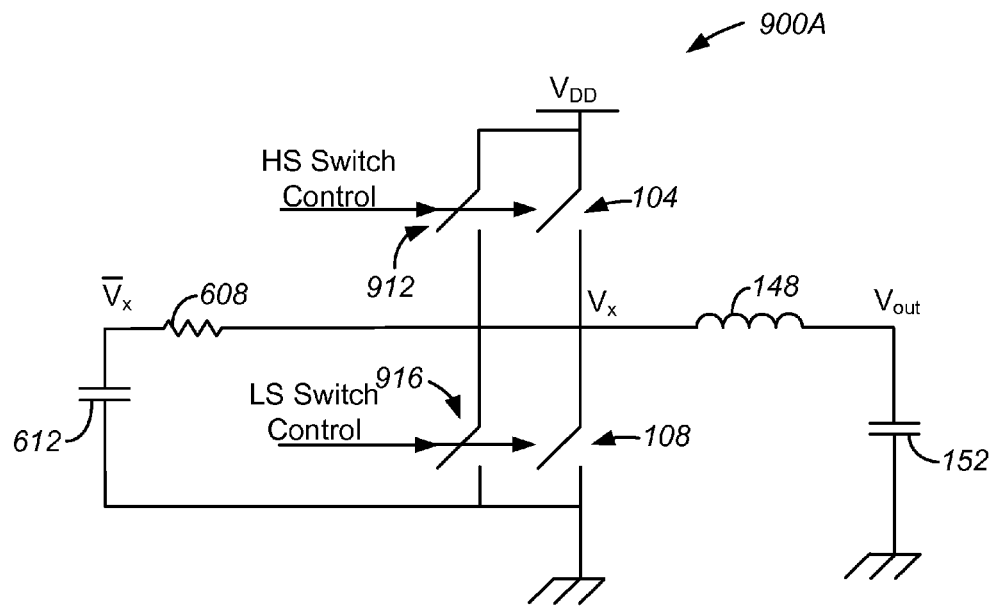
FIG. 9A is a simplified diagram of an example of buffer tri-state circuitry incorporating replica transistors for generating a virtual output voltage feed-forward signal in a discontinuous conduction mode ("DCM") architecture, according to some implementations.

FIG. 9A is a simplified diagram of an example of buffer tri-state circuitry incorporating replica transistors for generating a virtual output voltage feed-forward signal in a DCM architecture, according to some implementations. FIG. 9A is a simplified representation of the replica buffer implementations of FIGS. 8A and 8B, with high side and low side switches 104 and 108 coupled respectively to replica switches 912 and 916, regardless of whether the switches are constructed with n-channel or p-channel transistors. In FIG. 9A, a high side switch control signal controls both high side switch 104 and replica switch 912, while a low side switch control signal controls both low side switch 108 and replica switch 916. In one example, returning to FIG. 1B, the high side switch control signal can be generated by driver 106, while the low side switch control signal can be generated by driver 110. In some examples, when the gates of transistors implementing replica switch 912 and high side switch 104 are coupled, the high side switch control signal can drive both gates simultaneously. The same is true for the low side switch control signal in relation to replica switch 916 and low side switch 108. Thus, by coupling the respective pairs of gates, additional control circuitry can be omitted.

Figure 9B:
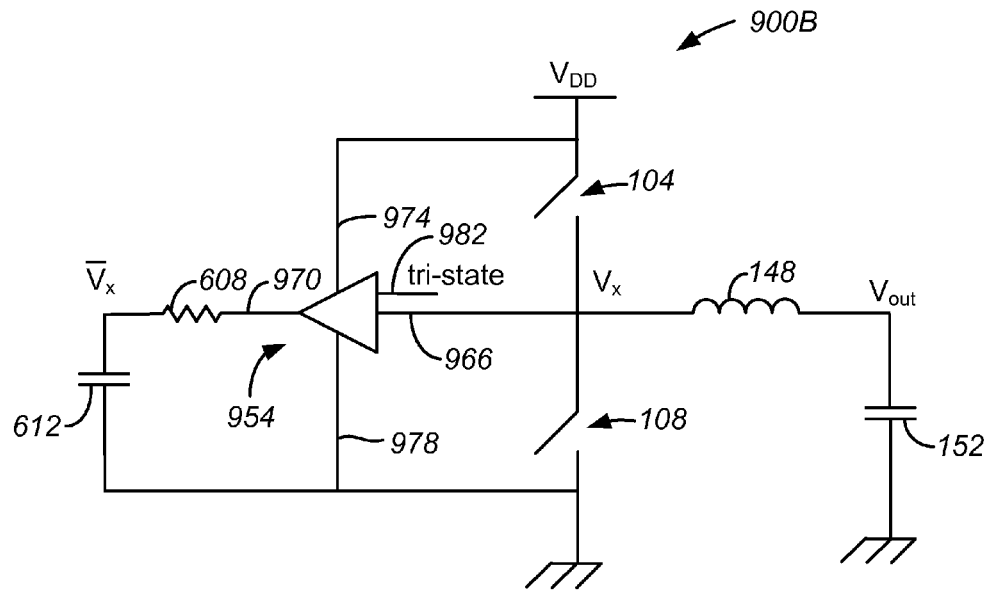
FIG. 9B is a simplified diagram of another example of buffer tri-state circuitry for generating a virtual output voltage feed-forward signal in a DCM architecture, according to some implementations.

FIG. 9B is a simplified diagram of another example of buffer tri-state circuitry for generating a virtual output voltage feed-forward signal in a DCM architecture, according to some implementations. FIG. 9B is a simplified representation of a logic buffer implementation, described above with respect to FIGS. 6 and 7. In FIG. 9B, a buffer 954 has an input 966 coupled in the same manner as buffer input 616 of FIG. 6 and an output 970 coupled in the same manner as buffer output 620 of FIG. 6. By the same token, in FIG. 9B, buffer 954 has a high reference input 974 coupled in the same manner as high reference input 624 of buffer 604 and a low reference input 978 coupled in the same manner as low reference input 628 of buffer 604, in FIG. 6. In FIG. 9B, buffer tri-state control circuitry can be configured to monitor the voltage at Vx and activate a tri-state input 982 to cause buffer 954 to enter a high impedance state when a tri-state condition occurs at switch circuitry 102.

Figure 10A:
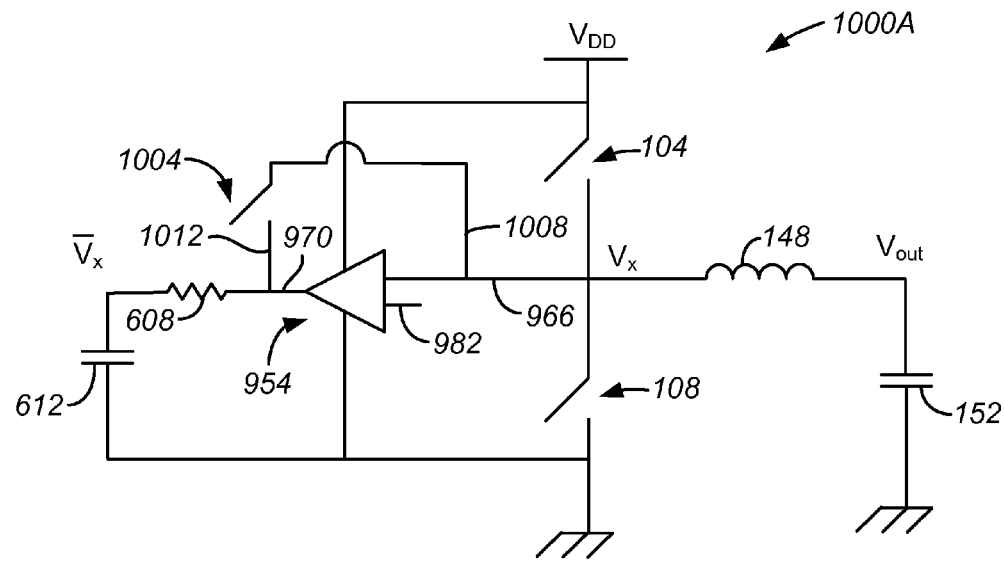
FIGS. 10A and 10B are simplified diagrams of examples of buffer bypass circuitry for generating a virtual output voltage feed-forward signal in a DCM architecture, according to some implementations.

FIG. 10A is a simplified diagram of an example of buffer bypass circuitry for generating a virtual output voltage feed-forward signal in a DCM architecture, according to some implementations. The circuit components and configuration of FIG. 9B described above appear in FIG. 10A, with like reference numerals indicating like parts. In addition, FIG. 10A incorporates buffer bypass circuitry including a bypass switch 1004 having an input terminal 1008 coupled to buffer input 966 and an output terminal 1012 coupled to buffer output 970. When a tri-state condition of switch circuitry 102 is detected, for instance, by monitoring the voltage at node Vx, a bypass control signal can be provided to bypass switch 1004, causing switch 1004 to close and thus short buffer 954. By the same token, such a control signal can cause bypass switch 1004 to be open when no tri-state condition is detected. In this way, when bypass switch 1004 closes, node Vx is coupled directly to the RC filter of the buffer circuitry, represented by resistor 608 and capacitor 612. The capacitor 612 of the RC filter can thus be prevented from storing charge representing a stored average Vx voltage in situations when a tri-state condition arises in both switch circuitry 102 and buffer 954.

Figure 10B:
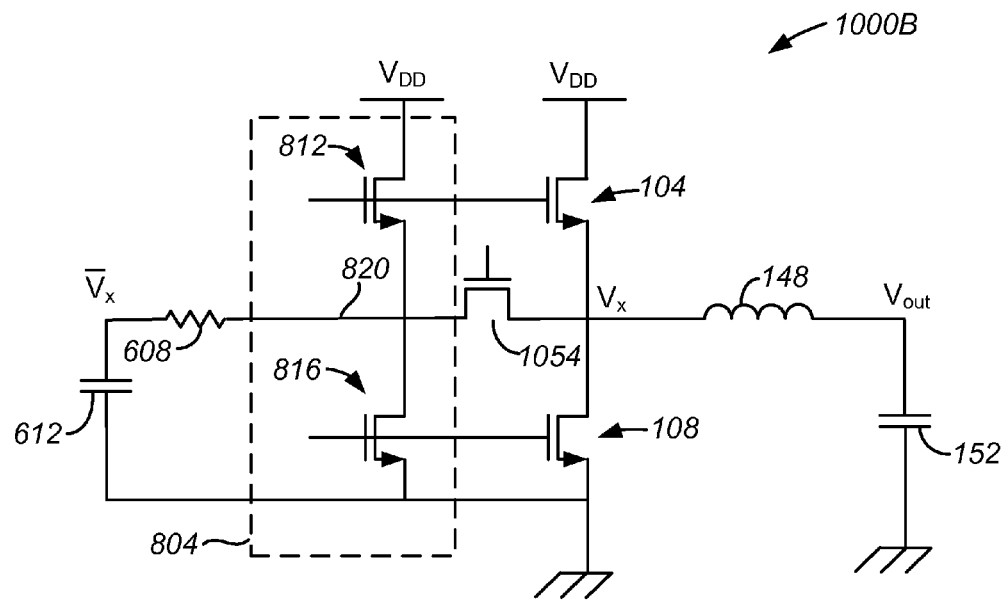

FIG. 10B is a simplified diagram of another example of buffer bypass circuitry for generating a virtual output voltage feed-forward signal in a DCM architecture, according to some implementations. The circuit components and configuration of the buffer with replica transistors of FIG. 8A described above appear in FIG. 10B, with like reference numerals indicating like parts. In addition, FIG. 10B incorporates buffer bypass circuitry including a bypass switch 1054 implemented in the form of an n-channel transistor coupled between node Vx and buffer output 820 as shown in FIG. 10B. When a tri-state condition of switch circuitry 102 is detected by monitoring the voltage at node Vx, a bypass control signal can be provided to the gate of bypass switch 1054, causing switch 1054 to close and thus short buffer 804. By the same token, such a control signal can cause bypass switch 1054 to be open when no tri-state condition is detected.

The disclosed buffer circuit configurations and techniques are also applicable to a variety of other control schemes and architectures benefiting from pseudo-fixed frequency concepts, that is, where the output voltage of the voltage regulator is monitored and applied as a control parameter to control the switching of voltage regulator components such as switch circuitry 102, as shown in FIG. 1A or FIG. 1B. That is, various control schemes can benefit from substituting a virtual output voltage feed-forward signal generated using the techniques disclosed herein for the actual output voltage as a control parameter of the regulator. For example, the disclosed circuitry and methods can be implemented in hysteretic current mode control architectures. In such cases, a virtual output voltage feed-forward signal can provide a control parameter to control a ripple band magnitude, for instance, by adjusting one or both of upper and lower ripple thresholds of a ripple band generator.

Figure 11:
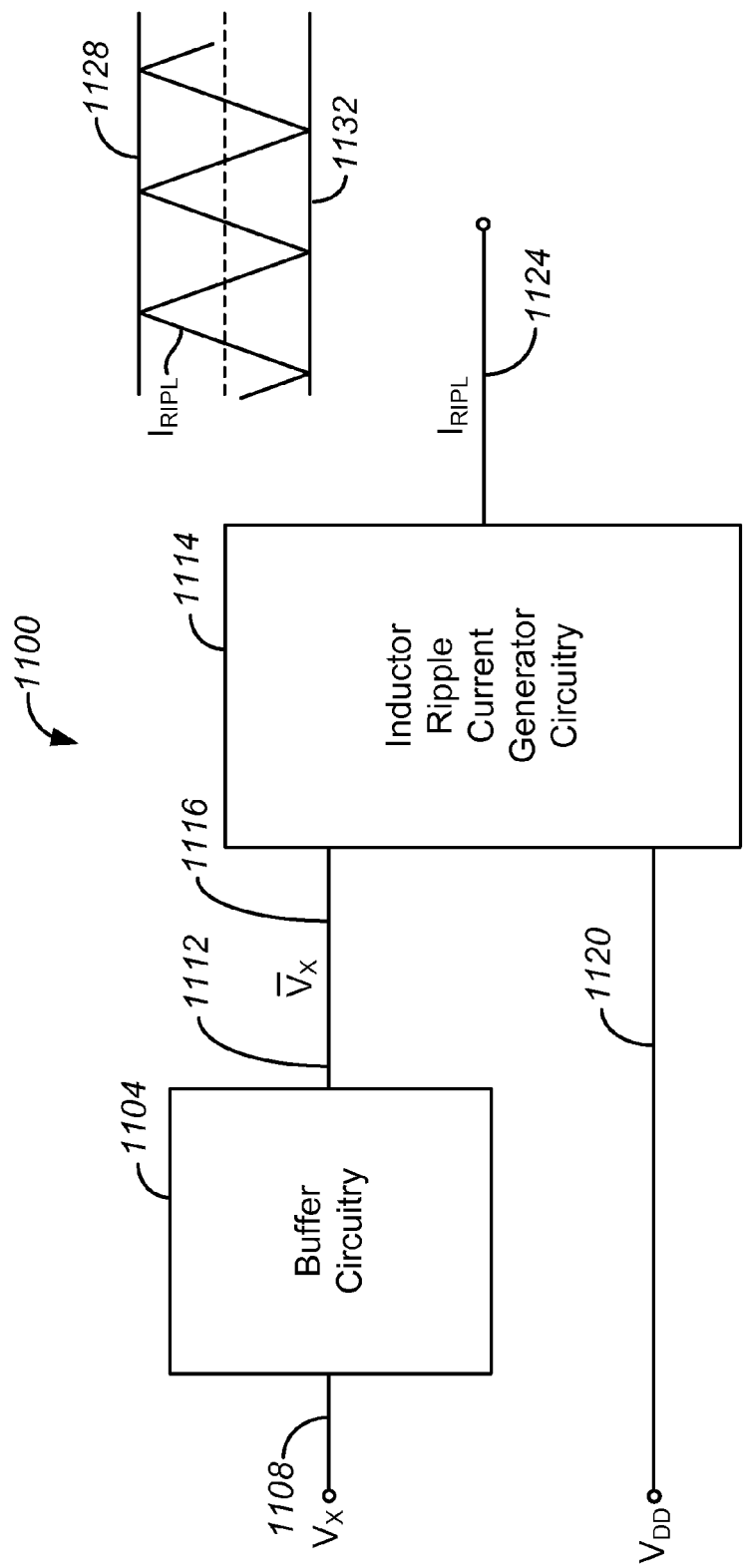
FIG. 11 is a simplified diagram of an example of ripple band generator circuitry for controlling an inductor ripple current based on a virtual output voltage feed-forward signal, according to some implementations.

FIG. 11 is a simplified diagram of an example of ripple generator circuitry for controlling an inductor ripple current based on a virtual output voltage feed-forward signal, according to some implementations. In circuitry 1100 of FIG. 11, which is one example of a hysteretic current mode control architecture, buffer circuitry 1104 incorporates any of the buffer implementations disclosed herein. The buffer circuitry 1104 has an input 1108 coupled to monitor the Vx waveform and generate a virtual output voltage feed-forward signal at output 1112, as described in the various examples above. Inductor ripple current generator circuitry 1114 has a first input 1116 coupled to buffer circuitry output 1112 to receive the virtual output voltage feed-forward signal. The inductor ripple current generator circuitry 1114 has a second input 1120 coupled to receive an input voltage such as $V_{DD}$ as a second input.

The inductor ripple current generator circuitry 1114 is configured to generate at an output 1124 an inductor ripple current ("$I_{RIPL}$") according to the virtual output voltage feed-forward signal and $V_{DD}$, where $I_{RIPL}$ is provided to an inductor of an output filter of the voltage regulator. For example, inductor ripple current generator circuitry 1114 can set and/or adjust one or both of an upper current threshold 1128 and a lower current threshold 1132 defining $I_{RIPL}$ in response to changes in the virtual output voltage feed-forward signal in relation to $V_{DD}$. In FIG. 11, the inductor ripple current generator circuitry 1114 can be integrated or otherwise incorporated with other control circuitry providing hysteretic current mode control of a voltage regulator.

In one example of a hysteretic current mode control architecture, returning to FIG. 1A, switching control circuitry 112 is configured to adjust the ripple band of $I_L$ responsive to the virtual output voltage feed-forward signal as described above, for instance, by adjusting one or more of the upper threshold and the lower threshold levels defining the ripple band. In this example, switching control circuitry 112 is configured to compare the inductor current, $I_L$, with the upper threshold of the ripple band, and compare $I_L$ with the lower threshold of the ripple band. In this way, when $I_L$ reaches the upper threshold level, the circuitry turns on low side switch 108 and turns off high side switch 104 of switch circuitry 102, and when $I_L$ reaches the lower threshold level, the circuitry turns off low side switch 108 and turns on high side switch 104.

In addition, the disclosed buffer circuit configurations and techniques can be modified by changing or replacing voltage supplies used to provide the high and low reference voltages of a buffer. Changing such reference voltage levels to be different from voltages connected to the switch circuitry can introduce different operational behaviors into a voltage regulator. By way of example, hysteretic current mode, hysteretic voltage mode, constant on time mode, constant off time mode, and other schemes can be achieved using the same disclosed buffer control and modulation concepts.

Depending on the desired implementation, different devices, apparatus, circuitry, components, mechanisms, modules, and units as described herein can be fabricated so that they share the same substrate, e.g., are on the same die or chip. For example, buffer circuitry 208 of FIG. 2 can be integrated with switch circuitry 102 and one or more other voltage regulator components, such as switching control circuitry 112 of FIGS. 1A and 1B, on the same die. In an alternative implementation, one or more devices, apparatus, circuits, components, mechanisms, modules, and/or units described herein can be fabricated on different substrates, e.g., on different chips. By the same token, such devices, apparatus, circuits, components, mechanisms, modules, and/or units can be provided in the same or different packages. For instance, buffer circuitry 208 can be fabricated on a first die and interconnected with switching control circuitry 112 fabricated on a different second die, and provided in the same package. In another example, buffer circuitry could be fabricated as a discrete component physically separate from other components, such as circuitry 112 and 102 of the voltage regulators described above, and provided in different packages.

While the disclosed subject matter has been particularly shown and described with reference to specific implementations thereof, it will be understood by those skilled in the art that changes in the form and details of the disclosed implementations may be made without departing from the spirit or scope of the disclosure. The present disclosure should, of course, not be limited to the depicted implementations. In addition, although various advantages and aspects of the disclosed subject matter have been discussed herein with reference to various implementations, it will be understood that the scope of the disclosure should not be limited by reference to such advantages and aspects. Rather, the scope of the disclosure should be determined with reference to the appended claims.

What is claimed is:

1. Circuitry for virtual output voltage sensing for feed-forward control of a voltage regulator, the circuitry comprising:
    a buffer having an input and an output, the buffer input coupled to sense a monitored signal indicating a duty cycle of switch circuitry coupled to an output filter of the voltage regulator, the switch circuitry configured to switch between a high voltage during a high side on time and a low voltage during a low side on time, the buffer configured to provide at the buffer output, responsive to the monitored signal, a buffer output signal having a high reference voltage for the high side on time and a low reference voltage for the low side on time;
    a filter coupled to receive and filter the buffer output signal to provide a feed-forward signal indicative of the output voltage of the voltage regulator;
    control circuitry configured to control the switching of the switch circuitry responsive to the feed-forward signal;
    buffer tri-state circuitry coupled to cause the buffer to enter a high impedance state responsive to a tri-state condition of the switch circuitry; and
    buffer bypass circuitry coupled to short the buffer responsive to the tri-state condition of the switch circuitry.

2. The circuitry of claim 1, wherein the buffer tri-state circuitry includes a high side switch and a low switch switching in association with the switch circuitry.

3. The circuitry of claim 1, wherein the tri-state condition of the switch circuitry is associated with a discontinuous mode of operation.

4. The circuitry of claim 1, wherein the buffer bypass circuitry includes a switch coupled between the buffer input and the buffer output.

5. The circuitry of claim 4, wherein the switch includes a transistor.

6. The circuitry of claim 1, wherein the buffer is a logic buffer.

7. The circuitry of claim 1, wherein the buffer includes one or more replica transistors associated with one or more transistors of the switch circuitry.

8. The circuitry of claim 7, wherein the one or more replica transistors are n-channel field effect transistors (FETs).

9. The circuitry of claim 7, wherein the one or more replica transistors are p-channel FETs.

10. The circuitry of claim 7, wherein each replica transistor has a gate coupled to a gate of an associated transistor of the switch circuitry.

11. The circuitry of claim 1, wherein the high reference voltage is the high voltage of the switch circuitry, and the low reference voltage is the low voltage of the switch circuitry.

12. The circuitry of claim 1, wherein the high reference voltage is dependent upon the high voltage of the switch circuitry, and the low reference voltage is dependent upon the low voltage of the switch circuitry.

13. The circuitry of claim 1, wherein the high reference voltage is independent of the high voltage of the switch circuitry, and the low reference voltage is independent of the low voltage of the switch circuitry.

14. The circuitry of claim 1, wherein a first one of the reference voltages is independent of a first associated voltage of the switch circuitry, and a second one of the reference voltages is dependent upon a second associated voltage of the switch circuitry.

15. The circuitry of claim 1, wherein the buffer input is coupled to an output of the switch circuitry.

16. The circuitry of claim 1, wherein the buffer input is coupled to an input of the switch circuitry.

17. The circuitry of claim 1, wherein the buffer includes: a first reference input coupled to receive the high reference voltage, and a second reference input coupled to receive the low reference voltage.

18. The circuitry of claim 1, wherein the filter includes a resistor and a capacitor.

19. The circuitry of claim 1, wherein the high side on time is fixed.

20. The circuitry of claim 1, wherein:
the control circuitry includes a timing controller configured to output a timing control signal to control the switching of the switch circuitry.

21. The circuitry of claim 20, wherein the timing controller is coupled to output the timing control signal to the switch circuitry responsive to a compare operation between the feed-forward signal and an input voltage signal.

22. The circuitry of claim 20, wherein the timing control signal is coupled to control the low side on time of the switch circuitry.

23. The circuitry of claim 20, wherein the timing control signal indicates a pulse width of a timer.

24. The circuitry of claim 1, wherein a varying current is provided to the output filter responsive to the switch circuitry switching between the high voltage and the low voltage, the varying current being defined by a ripple band.

25. The circuitry of claim 24, wherein the control circuitry is configured to adjust the ripple band of the varying current.

26. The circuitry of claim 24, wherein the ripple band of the varying current is defined by an upper threshold and a lower threshold between which the current varies.

27. The circuitry of claim 26, wherein adjusting the ripple band includes adjusting one or more of the upper threshold and the lower threshold.

28. The circuitry of claim 1, wherein the voltage regulator operates with a control scheme selected from the group consisting of: hysteretic current mode, hysteretic voltage mode, constant on time mode, and constant off time mode.

29. A voltage regulator comprising:
an output filter to be coupled to a load;
switch circuitry coupled to the output filter, the switch circuitry configured to switch between a high voltage during a high side on time and a low voltage during a low side on time; and
a buffer having an input and an output, the buffer input coupled to sense a monitored signal indicating a duty cycle of the switch circuitry, the buffer configured to provide at the buffer output, responsive to the monitored signal, a buffer output signal having a high reference voltage for the high side on time and a low reference voltage for the low side on time;
a filter coupled to receive and filter the buffer output signal to provide a feed-forward signal indicative of the output voltage of the voltage regulator;
control circuitry configured to control the switching of the switch circuitry responsive to the feed-forward signal;
buffer tri-state circuitry coupled to cause the buffer to enter a high impedance state responsive to a tri-state condition of the switch circuitry; and
buffer bypass circuitry coupled to short the buffer responsive to the tri-state condition of the switch circuitry.

30. A method for virtual output voltage sensing for feed-forward control of a voltage regulator, the method comprising:
sensing a monitored signal indicating a duty cycle of switch circuitry coupled to an output filter of the voltage regulator, the switch circuitry configured to switch between a high voltage during a high side on time and a low voltage during a low side on time,
providing, by a buffer and responsive to the monitored signal, a buffer output signal having a high reference voltage for the high side on time and a low reference voltage for the low side on time;
filtering the buffer output signal to provide a feed-forward signal indicative of the output voltage of the voltage regulator;
providing a control signal to the switch circuitry responsive to the feed-forward signal;
causing the buffer to enter a high impedance state responsive to a tri-state condition of the switch circuitry; and
shorting the buffer responsive to the tri-state condition of the switch circuitry.

31. The method of claim 30, wherein providing the control signal to the switch circuitry responsive to the feed-forward signal includes:
performing a compare operation between the feed-forward signal and an input voltage signal.

32. The method of claim 30, wherein the monitored signal is an output signal of the switch circuitry.

33. The method of claim 30, wherein the monitored signal is an input signal of the switch circuitry.

34. The method of claim 30, wherein the control signal is coupled to control the low side on time of the switch circuitry.

* * * * *